United States Patent [19]

Miller

[11] 4,317,499
[45] Mar. 2, 1982

[54] VEHICLE EMERGENCY STEERING SYSTEM

[75] Inventor: Wayne R. Miller, Dubuque, Iowa

[73] Assignee: Deere & Company, Moline, Ill.

[21] Appl. No.: 106,531

[22] Filed: Dec. 26, 1979

[51] Int. Cl.³ ............................................ B62D 5/006
[52] U.S. Cl. ..................................... 180/133; 60/405
[58] Field of Search .................. 180/133; 60/405, 403

[56] References Cited

U.S. PATENT DOCUMENTS

| | | | |
|---|---|---|---|
| 3,558,239 | 1/1971 | Schiber | 180/133 |
| 3,820,620 | 6/1974 | Miller | 180/133 |
| 3,995,711 | 12/1976 | Kittle | 180/133 |
| 4,076,096 | 2/1978 | Hushower | 180/133 |

*Primary Examiner*—Joseph F. Peters, Jr.
*Assistant Examiner*—Mitchell J. Hill

[57] ABSTRACT

An emergency steering system includes a backup pump which is driven by an electric motor, a control circuit for the motor includes a flow sensing switch and a pressure-sensing switch connected in series and operative to automatically energize the motor when a main pump is outputting no flow and the pressure at the pump outlet is below a predetermined minimum value for adequate steering operation.

5 Claims, 2 Drawing Figures

VEHICLE EMERGENCY STEERING SYSTEM

BACKGROUND OF THE INVENTION

The present invention relates to a vehicle steering system including electrohydraulic controls for automatically energizing an electric motor for driving a backup pump for supplying power steering fluid upon the failure of a main pump to output the necessary fluid, and more specifically relates to an improvement of the control system disclosed in U.S. Pat. No. 3,820,620 issued to Miller et al on June 28, 1974.

The Miller et al patent discloses both an open center steering system, wherein a fixed displacement main pump is used together with a flow sensing switch for monitoring the output thereof, and a closed center steering system, wherein a variable displacement main pump is used together with a pressure sensing switch for monitoring the output thereof. The present invention deals only with the closed center version of the steering system.

It has been found that with a closed center hydraulic steering system that both pressure and flow can vary from almost zero to maximum in various combinations during normal machine operations. Consequently, the patented system has the drawback that under some conditions of normal operation the pressure may fall below that at which the pressure switch is set thus resulting in unnecessary actuation of the electric motor for driving the backup fluid supply pump.

Another drawback of the patented system is that once the primary system has failed and the backup system has become actuated, the electric motor runs continuously even though a continuous requirement for power steering fluid is not present thus resulting in the battery power being continuously drained in the case where the main steering fluid supply pump is not being driven due to engine failure.

SUMMARY OF THE INVENTION

According to the present invention, there is provided a novel electrohydraulic control system for automatically energizing an electric motor driven backup steering pump.

An object of the invention is to provide an electrohydraulic control system for automatically energizing an electric motor driven backup steering pump only when a failure has occurred which results in an inadequate main supply of hydraulic steering fluid being available for normal steering operation.

More specifically, it is an object of the invention to provide an electrohydraulic control system, as set forth in the foregoing object, which includes a flow-sensing switch connected in series with a pressure-sensing switch for respectively monitoring the flow and pressure condition of the main source of hydraulic power steering fluid.

Yet another object is to provide an electrohydraulic control system as set forth in the immediately preceding object wherein the pressure switch is connected to monitor the pressure of the fluid outputted by the backup pump so as to effect de-energization of the electric motor driving the pump when no steering fluid is needed.

These and other objects will become apparent from a reading of the following description together with the appended drawing.

DESCRIPTION OF THE PREFERRED EMBODIMENT

Figure 1:
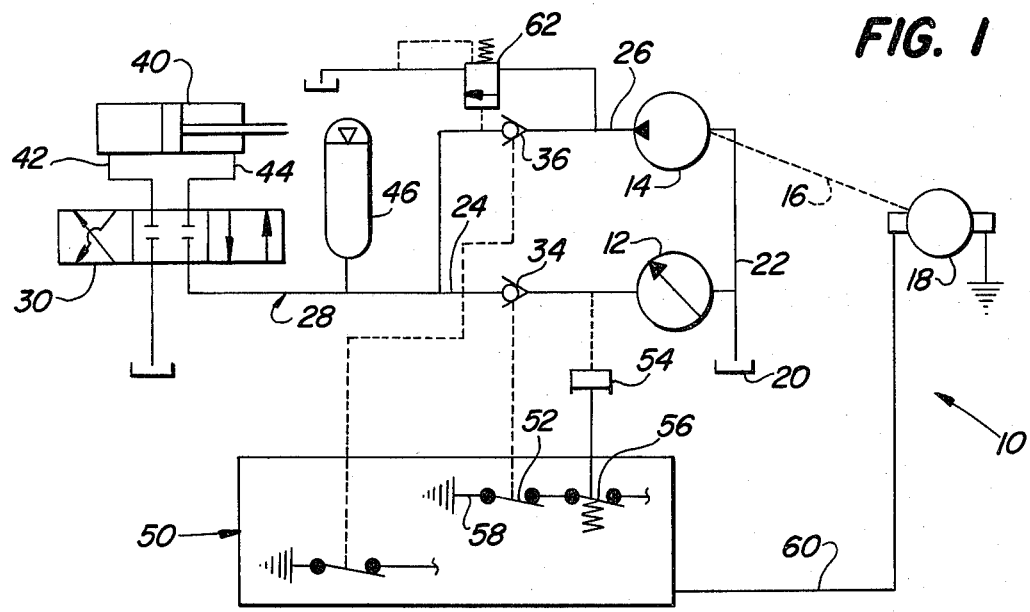
FIG. 1 is a schematic representation of a hydraulic power steering system embodying the present invention.

Referring now to FIG. 1, therein is shown a hydraulic power steering system 10 including a variable displacement, constant pressure main pump 12 and a fixed displacement backup or emergency pump 14. The main pump is preferably coupled to be driven by the vehicle engine in a conventional manner (not shown) while the back-up pump 14 is coupled, as represented by the dashed line 16, for being driven by an electric motor 18. The main and backup pumps 12 and 14 have respective inlets coupled to a sump 20 by means of a branched suction conduit 22 and have respective outlets coupled to parallel branches 24 and 26 of a branched feed conduit 28, which is coupled to a closed-center steering control valve 30. Respectively located in the branches 24 and 26 are one-way check vales 34 and 36, which respectively operate to isolate the pump 12 from the pump 14 and vice-versa.

The steering control valve 30 is here shown in a centered position wherein it blocks the output of the pumps 12 and 14 from a steering actuator means, here shown in the form of a two-way hydraulic cylinder 40 having its opposite ends connected to the valve 30 by a pair of conduits 42 and 44. The valve 30 would normally be connected for operation by a steering wheel or the like (not shown) so as to be shifted in one way or the other from its neutral position respectively in response to rotation of the steering wheel in opposite directions from a centered position.

A small hydraulic accumulator 46 is coupled in the feed conduit 28 downstream from the check valve 34 and 36 and functions to even out pressure surges in the system.

The operation of the electric motor 18, and hence the backup pump 14, is controlled automatically through means of an electrical control system 50, here merely represented by a functional box for the sake of brevity. The control system 50 may be of any construction capable of monitoring the condition of the fluid being supplied by the main and backup pumps 12 and 14. Applicant's co-pending application Ser. No. 106,831 filed on even date with the instant application discloses a suitable control system.

Inasmuch as all failures of the main pump 12 will result in a concurrent loss of flow and pressure, means are provided for the control system 50 to monitor these conditions. Specifically, the one-way check valve 34 is constructed to also function as a flow-sensing switch having a normally closed set of contacts 52 which are opened anytime the main pump is supplying a sufficient flow of fluid for adequate steering. Located in the conduit branch 24 between the main pump 12 and valve 34 is a pressure switch 54 having a normally closed set of contacts 56, which are opened anytime the pump 12 is outputting fluid at a pressure sufficient for adequate steering. The control system 50 includes a control current line 58, only partially shown, having the sets of switch contacts 52 and 56 connected therein in series such that both sets are closed when there is a failure of the pump 12 to thereby effect completion of a current path through the control current line to energize other portions (not shown) of the circuit 50 to cause current to be outputted to the motor 18 via a lead 60, to thereby cause automatic operation of the backup pump 14.

Due to the fact that the backup pump 14 has a fixed displacement and operates continuously once the motor 18 is energized, the fluid pumped thereby must be unloaded when no steering is being done. Accordingly, an unloading valve 62 is coupled in the conduit branch 26 for unloading the unrequired fluid.

Figure 2:
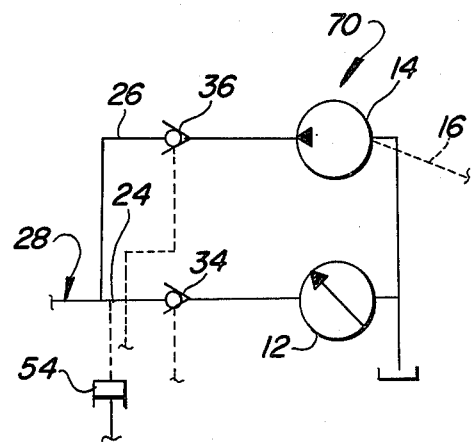
FIG. 2 illustrates a variant of a portion of the system illustrated in FIG. 1, which effects automatic shutdown of the backup pump drive motor when there is no requirement for power steering fluid.

Referring now to FIG. 2, there is shown a system 70, which is a varient of the system 10 illustrated in FIG. 1, for permitting the unloading valve 62 to be omitted. Specifically, the pressure switch 54 in the system 70 has been moved to a location in the conduit branch 26 which is downstream from the check valve 34. Thus the pressure of the fluid delivered by the backup pump 14 is imposed on the switch 54 and by selecting a suitable pressure for operation of the switch 54, the latter will operate to open the switch contacts 56 to automatically disrupt current flow through the control current line 58 and hence flow to the motor 18 via the line 60 when no requirement for power steering fluid exists. The valve 62 could of course be retained as a margin of safety but its unload pressure would have to be set at some value above that for the operation of the pressure switch 54.

I claim:

1. A hydraulic power steering system, comprising: a variable displacement, constant pressure main pump; a backup pump; an electric motor coupled for driving the backup pump; a steering control valve; hydraulic circuitry connecting respective outputs of the main and backup pumps to the steering control valve; first and second check valves respectively connected in the circuitry in communication with the respective outputs of the main and backup pumps for preventing the flow of fluid from the main pump to the backup pump and vice-versa; an electrical control circuit connected to the motor and including a normally closed flow switch connected to the hydraulic circuitry in flow-receiving relationship to the main pump and being operative to open in response to flow being outputted by the main pump; said electrical control circuit further including a normally closed pressure switch connected in series with the flow switch to effect energization of said electric motor only upon both switches being closed; said pressure switch being connected in the hydraulic circuitry in fluid communication with the steering control valve and being operative to open in response to the fluid pressure being at a predetermined minimum value for effecting adequate power steering whereby the backup pump will be driven only in the event that the main pump does not ouput any fluid and the pressure is below the predetermined minimum value.

2. The hydraulic power steering system defined in claim 1 wherein the pressure switch is connected in the hydraulic circuitry to be in fluid communication with fluid outputted by the backup pump whereby the pressure switch will open to de-energize the electrical motor anytime there is no demand for steering fluid and the pressure is at said predetermined minimum value.

3. The hydraulic power steering system defined in claim 2 and further including a hydraulic accumulator being connected in the hydraulic circuitry between the backup pump and the steering control valve for preventing the pressure switch from cycling between its open and closed positions.

4. The hydraulic power steering system defined in claim 1 wherein the backup pump has a fixed displacement and the steering control valve is a closed-center valve; and an unloading valve coupled in fluid communication with the auxiliary pump output at a point before the second check valve.

5. The hydraulic power steering system defined in claim 1 wherein the pressure switch is connected between the first check valve and the main pump.

* * * * *